March 24, 1970  O. B. BRAMLEY  3,502,199
CONVEYOR ASSEMBLY
Filed March 11, 1968  2 Sheets-Sheet 1
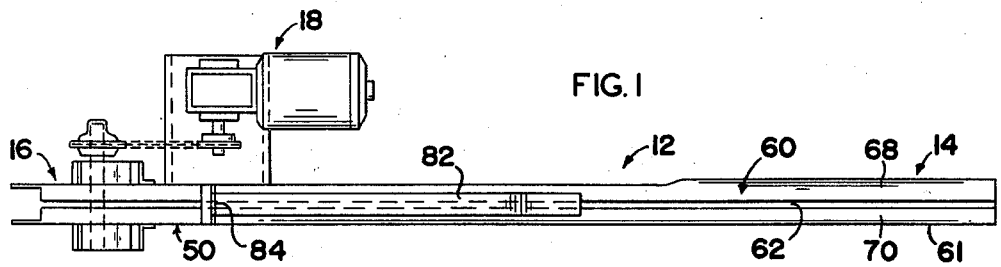
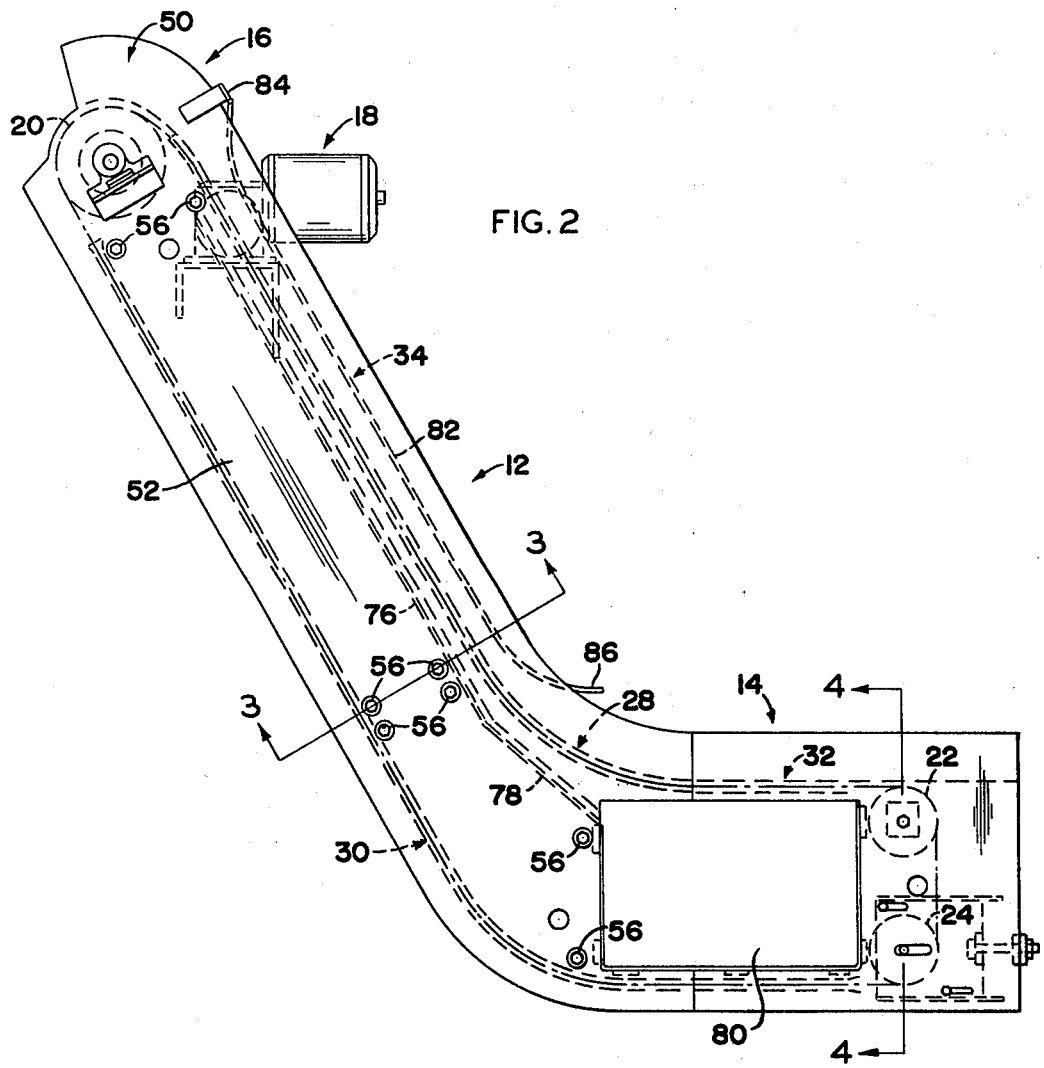
INVENTOR.
ORIN B. BRAMLEY
BY
Meyer, Tilberry & Body
ATTORNEYS.

March 24, 1970     O. B. BRAMLEY     3,502,199

CONVEYOR ASSEMBLY

Filed March 11, 1968     2 Sheets-Sheet 2

INVENTOR.
ORIN B. BRAMLEY
BY
Meyer, Tilberry & Body
ATTORNEYS.

United States Patent Office 3,502,199
Patented Mar. 24, 1970

3,502,199
CONVEYOR ASSEMBLY
Orin B. Bramley, Euclid, Ohio, assignor to May-Fran Manufacturing Corporation, Cleveland, Ohio, a corporation of Ohio
Filed Mar. 11, 1968, Ser. No. 712,028
Int. Cl. B65g 19/00
U.S. Cl. 198—173           5 Claims

ABSTRACT OF THE DISCLOSURE

A small portable conveyor for transporting small objects such as bolts or screws away from a bolt, screw or other machine and to discharge the same preferably at a different elevation. The conveyor housing defines a trough above the upper run of the conveyor belt. A slot running longitudinally along the base of the trough accommodates pusher bars attached to the conveyor belt extending upwardly through the slot and advanced along the slot by the belt.

---

The present invention relates to a conveyor, and in particular to a small portable-type conveyor assembly for transporting small objects such as bolts or screws away from a bolt, screw or other machine.

A bolt or screw machine is generally of the punch-type, and the screws, bolts or like objects which are formed by the machine are generally ejected from the machine into a container placed next to the machine. When the container is filled, it is pulled away from the machine, and an empty container is positioned in its place.

It is an object of the present invention to provide a small conveyor assembly which can be positioned next to a bolt, screw or other machine, and which can receive at an inlet end screws, bolts or other small objects ejected from the machine.

It is a further object of the invention to provide a conveyor assembly which is particularly adapted to convey small objects such as bolts or screws.

It is a still further object of the invention to provide a conveyor assembly which is capable of conveying bolts, screws and other small objects from a first elevation and to discharge such objects at a second elevation different from said first elevation.

In accordance with the invention there is provided a conveyor assembly having a receiving end and a discharge end. Reversing pulley means are positioned at the ends of the conveyor assembly, and a conveyor belt travels between the pulley means comprising an upper run and a lower run. Drive means are provided for the conveyor belt. Above the conveyor belt upper run, there is provided a longitudinally extending upwardly facing trough, in the shape of a V, the trough also defining a slot at the base thereof which runs along the trough and is at least substantially coextensive with the belt upper run. The belt comprises a plurality of upwardly extending pusher bars extending through the slot and spaced at intervals along the belt.

Preferably, the belt upper run defines a first horizontal extent adjacent the receiving end of the belt, and an upwardly oriented extent leading from the horizontal extent to the discharge end, the latter being at an elevation higher than the elevation of the receiving end.

The invention, and objects thereof, will become more apparent upon consideration of the following specification, with reference to the accompanying drawings, in which:

FIGURE 1 is a top plan view of a conveyor in accordance with the invention;

FIGURE 2 is a side-section view of a conveyor in accordance with the invention;

Figure 3:
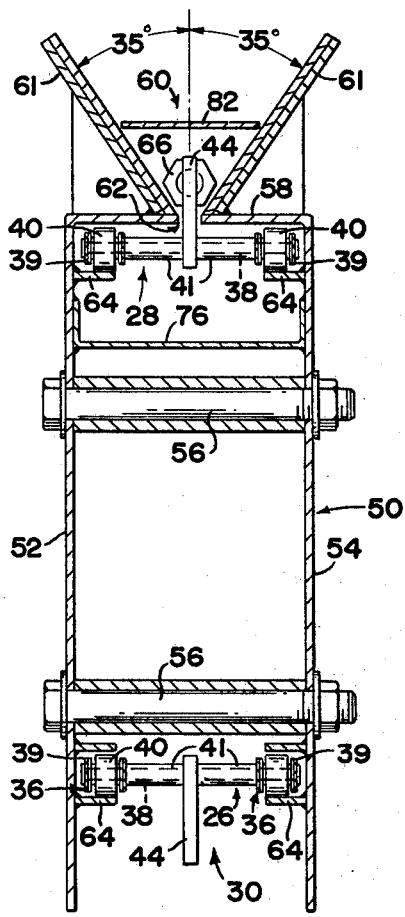
FIGURE 3 is a section view taken along line 3—3 of FIGURE 2.

Referring to the drawings and in particular to FIGURE 1, there is illustrated a conveyor assembly 12 having a receiving end 14 and a discharge end 16. At the discharge end there is positioned a suitable drive means 18 for the conveyor assembly.

Figure 4:
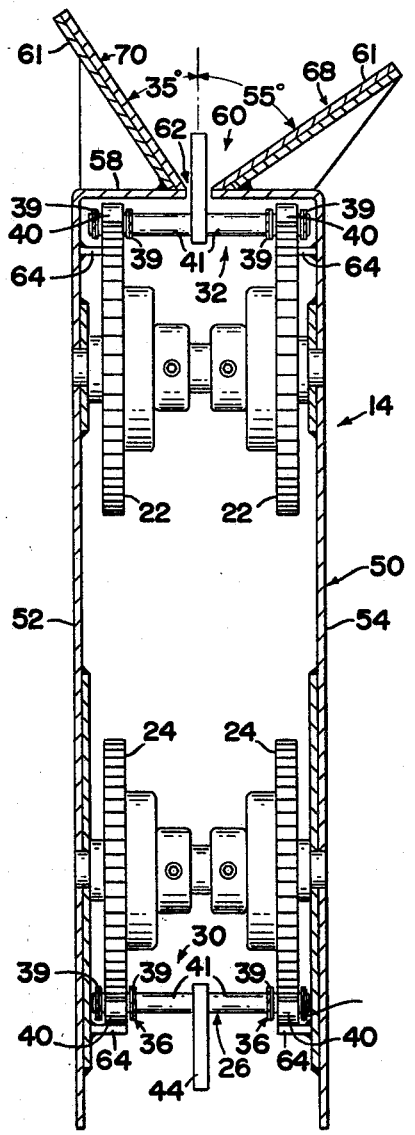
FIGURE 4 is a section view taken along line 4—4 of FIGURE 2.

As shown in FIGURE 2, the receiving end 14 is at a lower elevation than the discharge end 16. At the higher elevation discharge end, a reversing pulley 20 is connected to the drive means 18, so that it constitutes the drive pulley for the assembly. At the lower receiving end 14, there are positioned two vertically spaced pulleys 22 and 24 together reversing the direction of the conveyor belt 26. FIGURE 4 shows the vertical spacing of the upper and lower receiving end pulleys 22 and 24 from each other.

Still referring to FIGURE 2, the conveyor belt has an upper run 28, and a lower run 30, both runs having at the receiving end a substantially horizontal extent 32, and forward of the horizontal extent, an upwardly oriented extent 36 angled approximately 30° with the vertical and leading to discharge end 16.

The horizontal lower extent is positioned perhaps at about knee height next to a bolt, screw or other machine for receiving the small formed objects ejected from the machine, and the upper discharge end is placed next to a second conveyor belt or suitable container, depending upon assembly line requirements, at about waist height.

Figure 5:
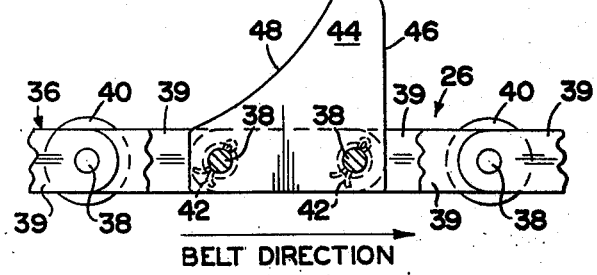
FIGURE 5 is a section view of a portion of the conveyor belt in accordance with the invention.

FIGURES 3, 4 and 5 illustrate details of the conveyor belt. The belt is of the link type, with link chains 36 on opposite sides of the belt connected together by pins 38. The links of each chain are each defined by a plurality of side plates 39 with the side plates of successive links being overlapped and connected together by the pins 38 connecting one link to the next. Between the side plates of each of the link chains, turning on the pins 38, are a succession of rollers 40 whose faces are grooved to define a plurality of teeth cooperating with sprocket teeth of the reversing wheels 20, 22 and 24, enabling the link chains to travel with the reversing wheels. Between the link chains, on each pin, holding the chains in the desired spaced apart relationship are cylindrical collars 41. Engaging the outside surfaces of the side plates, and holding the plates on the link pins, are suitable washer and cotter pin assemblies 42.

Referring to FIGURE 3, the cylindrical collars 41 are, on preselected pins, in two sections and hold between them a plurality of pusher bars 44 centered between the link chains 36. As shown in FIGURE 5, the pusher bars have a longitudinal length sufficient to extend between and be connected to two adjacent link pins 38, and also are provided each with a forward face 46, with reference to the belt direction, at 90° with respect to the general plane of the belt. The rearward face 48 of each pusher bar slopes rearwardly and downwardly from the point of the pusher bar furthermost removed from the belt, down to about the plane of the belt.

The conveyor assembly 12 is provided with a housing 50 (FIGURES 2, 3 and 4) which has an overall shape (FIGURE 2) corresponding roughly to the runs of the conveyor belt. With reference to FIGURES 3 and 4, the housing 50 comprises side plates 52 and 54 held together by bolt assemblies 56 and defining in cross section a somewhat rectangular member. The upper surface 58 of the housing supports a V-shaped trough 60, reinforced in that the sides 61 of the trough are made up of two plates or are double in thickness. The upper surface 58 of the housing is slotted along its length, defining a slot 62, and the opposed sides 61 of the trough are individually formed from or welded to the upper surface 58 so as not to cover the slot 62.

Slightly beneath the upper surface 58 of the housing, supported on the opposite side plates 52 and 54, but extending inwardly, are track means 64 on which the rollers 40 of the belt link chains travel. The track thus guides the belt upper run close to the upper surface of the housing, so that throughout the upper run of the belt, the pusher bars 44 of the belt extend upwardly through the slot 62 into the trough 60. The track means 64 is also used to guide the belt along the lower run thereof. As shown in FIGURE 3, the sides of the trough are at approximately 70° with respect to each other to accommodate bolts and screws disposed in the trough, item 66 of FIGURE 3. The 90° faces of the pusher bars force the screws or bolts along the trough in a forwardly direction towards the discharge end of the conveyor assembly.

As mentioned with respect to description of the drawings, FIGURE 4 is a section view taken at the receiving end 14 of the conveyor assembly, whereas FIGURE 3 is a section view taken along the upwardly oriented extent 34. A particularly notable difference between these two views is the shape of the trough 60. At the receiving end, FIGURE 4, the right hand side 68 of the trough is angled at 55° relative the vertical, as compared to 35° for the left hand side 70. The purpose of this is to provide a slightly wider opening or mouth for the trough at the receiving end to receive the screws, bolts and the like. This orientation of the right hand side extends for approximately twenty inches from the receiving end of the conveyor assembly to the point where the conveyor begins to bend upwardly.

Turning again to FIGURE 3, a U-shaped chip pan 76 is positioned beneath the conveyor belt upper run for about two-thirds of the length of the conveyor belt, and in particular, beneath the upwardly oriented extent of the belt (notice FIGURE 1). The chip pan has a lower portion 78 which is angled slightly more to the horizontal than the upwardly extending portion thereof, leading into a drawer 80 disposed below the lower end of the pan. The purpose of the chip pan and drawer are to receive and collect particles of metal which are ejected from the screw or bolt machine or otherwise caught by the conveyor assembly trough, and which drop through the slot 62 of the trough. The chip drawer 80 may be suitably positioned within the conveyor on slides so that it can be withdrawn from the conveyor assembly when it is full.

FIGURES 1, 2 and 3 show a trough cover 82, hinged at the upper end thereof on connection 84 (FIGURE 2). The trough cover is dimensioned so that it lies within the trough (notice FIGURE 3), slightly above the space which would normally be occupied by objects conveyed within the trough, but is provided at its lower end with an upwardly and outwardly sloping surface 86 so that if an object larger than the contemplated bolt or screw is picked up by the conveyor belt the cover will be deflected upwardly without causing harm to the belt. At the same time, the cover provides protection against extraneous objects falling onto the conveyor assembly and into the assembly trough.

Although the invention has been described with reference to specific embodiments, variations within the scope of the following claims will be apparent to those skilled in the art.

What is claimed is:

1. A conveyor assembly comprising:
a receiving end and a discharge end;
reversing pulley means at said ends;
a conveyor belt having an upper run and a lower run between said pulley means;
drive means for said conveyor belt;
longitudinally extending upwardly facing trough means above said conveyor belt upper run substantially coextensive with the belt upper run;
slot means at the base of the trough means substantially coextensive with the trough means;
said belt comprising a plurality of upwardly extending pusher bars extending through said slot means and spaced at intervals along said belt;
said conveyor belt further comprising two spaced apart link chains defining opposite sides of the belt;
each chain comprising a plurality of successive links;
pin means connecting successive links together; at least some of said pin means extending between said link chains connecting said chains together;
said pusher bars being connected to and supported intermediate the link chains by two adjacent pin means which extend between the link chains.

2. A conveyor assembly according to claim 1 wherein said conveyor belt upper run has a first horizontal extent adjacent the conveyor assembly receiving end and a second upwardly extending extent adjacent the conveyor belt discharge end whereby the conveyor assembly discharge end is at a higher elevation than the conveyor assembly receiving end.

3. A conveyor assembly according to claim 2 wherein the trough means for the conveyor assembly defines a wider upwardly facing opening along the horizontal extent thereof than in the upwardly extending extent.

4. A conveyor assembly according to claim 2 further including a cover for said trough means, said cover being substantially coextensive with the conveyor belt upwardly extending extent;
hinge means connecting said cover at the upper end thereof to said trough means;
said cover at its lower end being curved outwardly away from the base of said trough means to permit deflection of the cover outwardly from the trough means.

5. A conveyor assembly according to claim 1 wherein said pusher bars comprise a forward face about 90° with respect to said conveyor belt when positioned in the upper or lower runs thereof, and a trailing face which slopes from the top of the pusher bar to about the plane of travel of the conveyor belt.

References Cited

UNITED STATES PATENTS

| | | | |
|---|---|---|---|
| 493,886 | 3/1893 | Ferverva | 209—307 |
| 1,109,062 | 9/1914 | Harjes | 198—173 |
| 1,902,873 | 3/1933 | Marone | 198—173 |
| 2,599,659 | 6/1952 | Phillips | 198—57 |
| 2,974,797 | 3/1961 | Blackman | 209—308 |

RICHARD E. AEGERTER, Primary Examiner

U.S. Cl. X.R.

198—204